(12) United States Patent
Bazakos et al.

(10) Patent No.: US 7,183,895 B2
(45) Date of Patent: Feb. 27, 2007

(54) SYSTEM AND METHOD FOR DYNAMIC STAND-OFF BIOMETRIC VERIFICATION

(75) Inventors: Michael E. Bazakos, Bloomington, MN (US); David W. Meyers, Brooklyn Park, MN (US); Murray Cooper, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 312 days.

(21) Appl. No.: 10/655,124

(22) Filed: Sep. 5, 2003

(65) Prior Publication Data

US 2005/0055582 A1  Mar. 10, 2005

(51) Int. Cl.
  *H04B 3/00* (2006.01)
(52) U.S. Cl. ............ 340/5.7; 340/550; 340/5.82; 340/5.81; 340/5.83; 340/5.52; 340/5.53; 340/5.7; 340/10.1; 340/825.69; 340/825.72; 382/118; 382/115; 235/375
(58) Field of Classification Search ........... 340/550, 340/5.82, 5.81, 5.83, 5.52, 5.53, 5.7, 10.1, 340/825.72, 825.69; 382/118, 115; 235/375
See application file for complete search history.

(56) References Cited

U.S. PATENT DOCUMENTS 5,801,763 A * 9/1998 Suzuki .................. 348/77
6,275,157 B1 * 8/2001 Mays et al. .............. 340/572.5
6,657,538 B1 * 12/2003 Ritter ................... 340/5.81
6,867,683 B2 * 3/2005 Calvesio et al. .......... 340/5.52
6,920,236 B2 * 7/2005 Prokoski ................ 382/115
2002/0132664 A1  9/2002 Miller et al.

FOREIGN PATENT DOCUMENTS

WO   WO 03/023695      3/2003
WO   WO 03/023695 A1   3/2003

OTHER PUBLICATIONS

International Search Report.
Fortner, Jennifer, "Project S-Gate—Improving Base Security," undated, Published in: US.

* cited by examiner

*Primary Examiner*—Brian Zimmerman
*Assistant Examiner*—Vernal Brown
(74) *Attorney, Agent, or Firm*—McDonnell Boehnen Hulbert & Berghoff LLP

(57) ABSTRACT

A system for providing stand-off biometric verification of a driver of a vehicle at a control gate while the vehicle is moving, including an RFID vehicle tag reader, an RFID personal tag reader and a facial detection and recognition (verification) system. The RFID vehicle tag reader scans and reads data from an RFID vehicle tag of the vehicle that is trying to pass through the gate. The RFID personal tag reader reads data from an RFID personal tag carried by personnel who are driving in the vehicle. The facial detection and verification system scans and reads facial images for the driver. All the data and facial images detected by the reader are sent to a computer for further processing (final face verification).

20 Claims, 6 Drawing Sheets

SYSTEM AND METHOD FOR DYNAMIC STAND-OFF BIOMETRIC VERIFICATION

BACKGROUND

FIELD OF THE INVENTION

The present invention relates generally to methods and systems for security identification, and more particularly, to methods and systems for personnel biometric verification.

BACKGROUND OF THE INVENTION

Security access control is an important issue for maintaining the safety of individuals and facilities. In a typical gate security system for a large facility, personnel must show their ID cards and/or display authorization tags on vehicles in order to gain access to the facility. In some cases, where a guard is not located at the gate, personnel can use a data card, such as an electronic data card, to release a gate to gain access to the facility. Once inside the facility, personnel must typically use the data card to open doors to enter into specific secured areas.

One well known type of security access control system is radio frequency identification (RFID), which is illustrated in FIG. 1. RFID system 10 comprises three basic elements: an antenna or coil 11, a transceiver 12 (with decoder) and a transponder 13 (i.e., an RFID tag) electronically programmed with unique identification information. Antenna 11 emits radio frequency signals to activate tag 13 and read and write data to it, and functions as a conduit between tag 13 and transceiver 12. Antenna 11 can take on various shapes and sizes. For example, antenna 11 can be built into a door frame to receive tag data from persons or things passing through the door, or mounted on structures such as an interstate toll booth to monitor the traffic passing on a highway. Antenna 11 is often packaged with transceiver 12 and decoder (not shown) to function as a reader (or interrogator), which can be configured either as a handheld or a fixed-mount device. The reader emits radio waves in a range of one inch to 100 feet or more, thereby establishing a predetermined electromagnetic zone. When an RFID tag passes through the electromagnetic zone, it detects the reader's activation signals. The reader then decodes the data encoded in the tag's integrated circuit and the data is passed to a host computer 15 via an RF module 16 for processing. Generally, RFID tags 13 can be either active or passive. Active RFID tags are powered by an internal battery and are typically readable and rewriteable. In a typical read/write RFID "work-in-process" system, an active RFID tag delivers a set of instructions to a machine, and the machine then reports its performance to the tag. In contrast, passive RFID tags operate without a separate external power source and obtain power generated from the reader.

A significant advantage of RFID systems is the non-contact and non-line-of-sight nature of the technology. In operation, when a person or subject carrying an RFID tag passes through a check point, the reader reads and decodes the data stored in the RFID tag and sends the decoded data to a computer for processing. RFID tags can be read through a variety of substances such as snow, fog, ice, paint, and other visually and environmentally challenging conditions. RFID tags can also be read under challenging circumstances such as when vehicles pass points at relatively high speeds. A typical reader can respond to an RFID tag in less than 100 milliseconds.

As mentioned above, RFID systems have been used to control facility access through a gate. In such a case, individuals carry an RFID tag or display an RFID tag in their vehicle. A reader composed of a transceiver and an antenna is installed at or near the gate so that when the individual is close to the gate, the reader reads the data embedded in the tags and sends the data to a computer for identification. If the data from the tag indicate that the individual or the vehicle is permitted entry, the gate will open to allow the individual or vehicle to enter. On the other hand, if the data shows that the individual or vehicle is not permitted entry, the gate will remain closed. In some cases, a guard will stop the vehicle to acquire more information from the individual or driver of the vehicle.

Reliance solely on an RFID system for identification, however, does not provide adequate security. Since the computer only matches the data of the RFID tag with those stored in a database, it is possible that the person who is carrying a valid RFID tag is, in fact, not authorized to gain access. Thus, a more advanced identification system is required.

Biometric verification is now being employed more frequently to verify personnel identification. Such systems typically comprise a database storing personal biometric information, such as facial templates or features, finger prints, band geometry, iris prints, thermograms, and skin colors of personnel. In a typical face imaging biometric system, the system takes an image or an image sequence of a person and then performs a "one-to-many" verification database search against the images stored in the database. This is done using 2D or 3D imaging technology. However, such a one-to-many search is very slow and often unreliable. Furthermore, present biometric verification systems typically require facial verification in a benign lighting and background environment with no relative facial movement. That is, the person who is requesting access must either stay still or move in a prescribed fashion while the system takes his/her image, or the individual must present their fingers or iris in direct contact to a biometric reader. This presentation requires direct contact and increases the overall time needed for completing the verification task.

As automated and higher security is increasingly demanded, an overall security system must be provided to adequately improve a facility's security posture, while minimizing the negative effects to work efficiency and quality of work life. Due to the disadvantages of excessively long waiting times and unreliable results mentioned above, currently employed Facial Recognition Systems (FRS) and RFID systems cannot yet uniquely satisfy fast and accurate verification requirements. Thus, a method and system that can more efficiently and rapidly identify personnel and/or vehicles is required.

BRIEF SUMMARY OF THE INVENTION

The present invention provides a fast and secure verification method and system that can dynamically identify vehicles and/or personnel by combining RFID and advanced facial detection and recognition techniques. Significantly, the method functions without requiring a vehicle and/or an individual to be in a particular place or posture, or come into physical contact with a biometric device.

More specifically, the present invention provides a method and system for dynamic stand-off biometric verification, in which a tri-band imaging scheme is employed to detect and recognize the face of an enrolled individual whose physical ID and an assigned RFID tag are related in an enrollment database.

In accordance with one embodiment of the present invention, a method for providing dynamic security verification comprises storing data regarding personal information and a face print (template) of the person in a database, wherein the face print is represented by numerical codes of a face digital image of the person. The method further comprises recording data regarding the personal ID information in a radio frequency identification (RFID) tag, reading data from the RFID tag, comparing the data with those stored in the database, retrieving a face print (usually a template) corresponding to the data read from the RFID from the database, and scanning (imaging) the face of the person in two near-IR bands in the reflective region of the spectrum to obtain two facial images. These two facial images comprise a low (reflective IR) band facial image and an upper (reflective IR) band facial image. The method then performs a weighted subtraction of the two facial images (fusion), and thresholds the resulting image to obtain an image of the exposed skin of the person. The method also performs a video scan of the face of the person, overlays the thresholded image (skin image on the video image (registered)), performs a model-based approach to determined the face part of the skin in the video image (face detection) and then compares the detected face with the retrieved face print.

In accordance with another embodiment, the face of the person (i.e., three-band facial images: low near-IR band, upper near-IR band, and the visible band mentioned above) is captured by a Tri-Band Imaging (TBI) system. Because of the common optics, the resulting three simultaneous images of the face of the person are precisely registered. If any of the associated three cameras operates with its own optics, the registration process must be performed algorithmically or otherwise.

In accordance with still another embodiment, a system for dynamical stand-off verification comprises an RFID tag on which an ID number is stored, a computer database for storing data regarding information and face prints and other personal information of a plurality of individuals, an RFID tag reader for reading the ID from the RFID tag, a facial recognition system for scanning the face of the personnel and obtaining facial images for the personnel, and a computer for processing the data read by the RFID tag reader and the facial images obtained by the facial recognition system. The IDs of the vehicle and driver read by the RFID reader and the scanned facial images are sent to the computer. The computer, according to the received RF IDs, retrieves the vehicle ID and personnel ID from the database and determines if the received ID matches with stored ID's. The computer also processes the facial images from the TBI camera to obtain a final facial image, retrieves stored images from the database and compares the two.

In accordance with a preferred embodiment, the facial detection and recognition system comprises a near-IR illuminator for generating near-IR light, an illumination adjustment module for adjusting the near-IR light based on environmental lighting conditions, a TBI camera for precise face detection and location, and a computer for processing the facial images to complete the verification process.

DETAILED DESCRIPTION OF THE INVENTION

The method and system of the present invention leverage RFID and dynamic biometric verification techniques to provide secure and fast access control solutions.

In accordance with the present invention, the method and system preferably utilize a tri-band imaging system that can dynamically capture a face within the context of an ambiguous image frame. The resulting facial image is then uniquely linked by information gleaned from an RFID tag to a stored facial image template in a database.

Since the present invention utilizes RFID to identify vehicles and personnel in combination with a dynamic facial recognition technique to identify face prints of the personnel, the present invention is capable of capturing key vehicle information and biometric data while a vehicle is moving at relative high speeds. According to the present invention, a dynamic facial recognition biometric scheme can scan a facial image of a subject, even at vehicle speeds up to about 40 miles per hour. An RFID scheme can read data from RFID tags at an even higher rate. Therefore, the present invention is particularly beneficial for use as a gate access control system for vehicles and personnel at a main gate of a facility, such as a military base, a governmental office or other locations that require increased security measures. The present invention, however, is not limited to gate access control applications. For example, the dynamic biometric verification of the present invention can also be beneficially used inside an office building to control personnel entering into different work areas. Furthermore, by double-checking the identification of a person by matching the RFID information and the facial information, the method and system of the present invention are capable of providing more secure identification.

Figure 2:
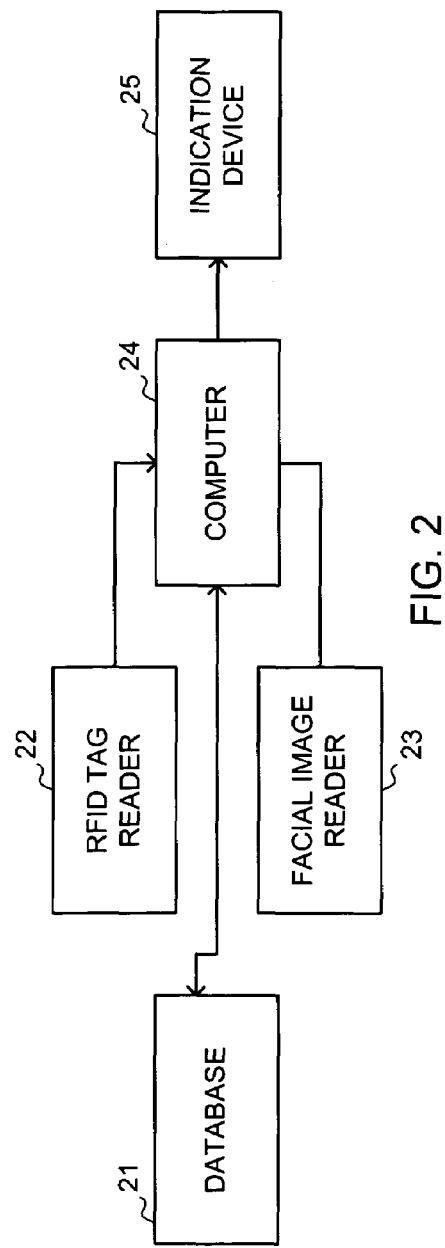
FIG. 2 is a schematic block diagram of a security system in accordance with a first embodiment of the present invention.

FIG. 2 is a schematic block diagram of a security system in accordance with a first embodiment of the present invention. The security system of FIG. 2 comprises a central computer (not shown) that preferably first stores relationship information of personnel and (if desired) their vehicles, as well as the personnels' biometric features in a database 21. This function can also be performed by computer 24. The relationship information of the personnel and their vehicles may include, for example, the license plate numbers, model types and colors of the vehicles. The biometric features of the personnel may include, for example, their facial images/photographs, their processed templates, and other data such as racial information (for example, facial skin and features) and cultural information (for example, the wearing of hats, hair styles, etc.). In accordance with the present invention, the facial information may be encoded by an exemplary local feature analysis (LFA) algorithm, which maps a face and creates a "face print" that is a unique numerical code for that face. Such techniques are well known in the art. After all the information has been stored in database 21, RFID tags (not shown) on which is recorded personnel unique ID numbers, are given to the personnel for carrying and/or displaying on their vehicles. The vehicle RFID tags store a RFID vehicle tag that uniquely identifies the vehicle, and an RFID personnel tag that uniquely identifies the person who drives or owns the vehicle. The RFID vehicle tag may be mounted on the vehicle and the RFID personnel tag may be carried by the person.

Figure 1:
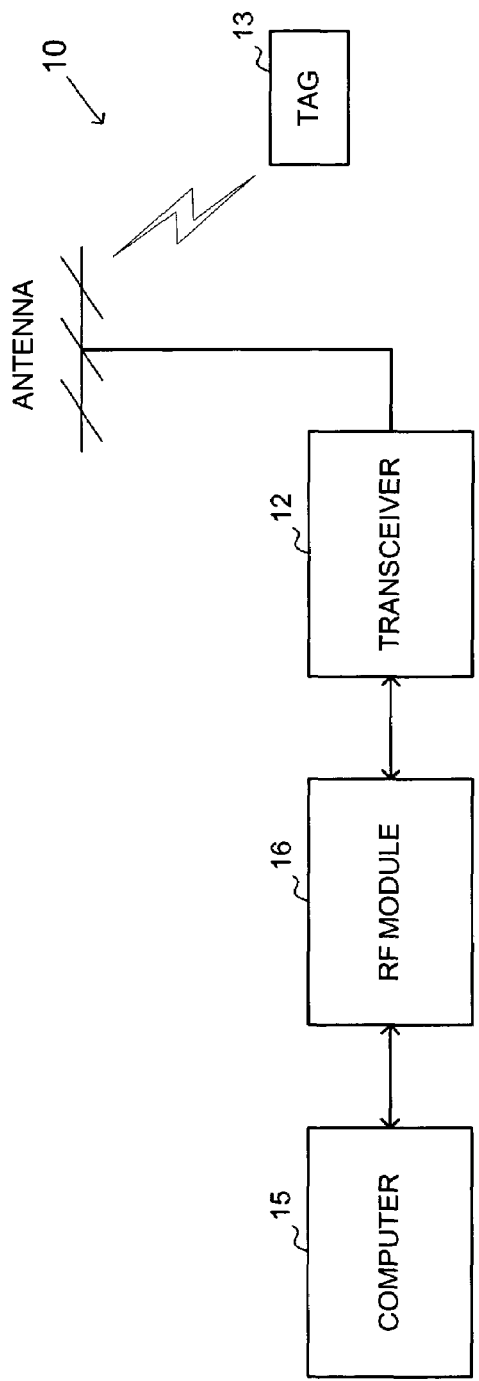
FIG. 1 depicts a prior art RFID system.

The system of FIG. 2 further includes an RFID tag reader 22 and a facial image reader 23, such as a TBI camera. The RFID tag reader 22 is used to read data from RFID tags carried by personnel and/or mounted on vehicles, such as the RFID vehicle tags and the RFID personnel tags mentioned above. RFID tag reader 22 may include an RFID vehicle tag reader and an RFID personnel tag reader (both of which will be described with reference to FIG. 3) for reading data from the RFID vehicle tag and the RFID personnel tag, respectively. In one possible implementation, the RFID vehicle tags may be the passive type that do not have batteries, and the RFID personnel tags may be the active type, which includes batteries, as described with respect to FIG. 1. Facial image reader 23 is used to take a digital facial image of a person who intends to pass through an access gate.

The data read by readers 22 and 23 are then sent to a computer 24 for further processing. Computer 24, after receiving the data, decodes the data received from RFID tag reader 22, retrieves stored vehicle information and personnel information from database 21 that correspond to decoded data, and performs a matching process to see if the decoded data matches with stored information. Moreover, computer 24 retrieves a stored face print from database 21 based on the decoded data obtained from RFID tag reader 22 and compares the stored face print with the facial image obtained from facial image reader 23. If all the information matches, then indication device 25 indicates that the vehicle and personnel are authorized to enter. If any of the information does not match with stored data, indication device 25 then indicates that a further investigation is necessary. In one embodiment of the present invention, the indication device 25 may be an indication light. In another embodiment of the present invention, the indication device 25 may be a lock controlling device that releases a lock when the vehicle and/or personnel are authorized entry, and keeps the lock closed when any of the vehicle data, personnel data and facial image does not match with stored information.

Figure 3:
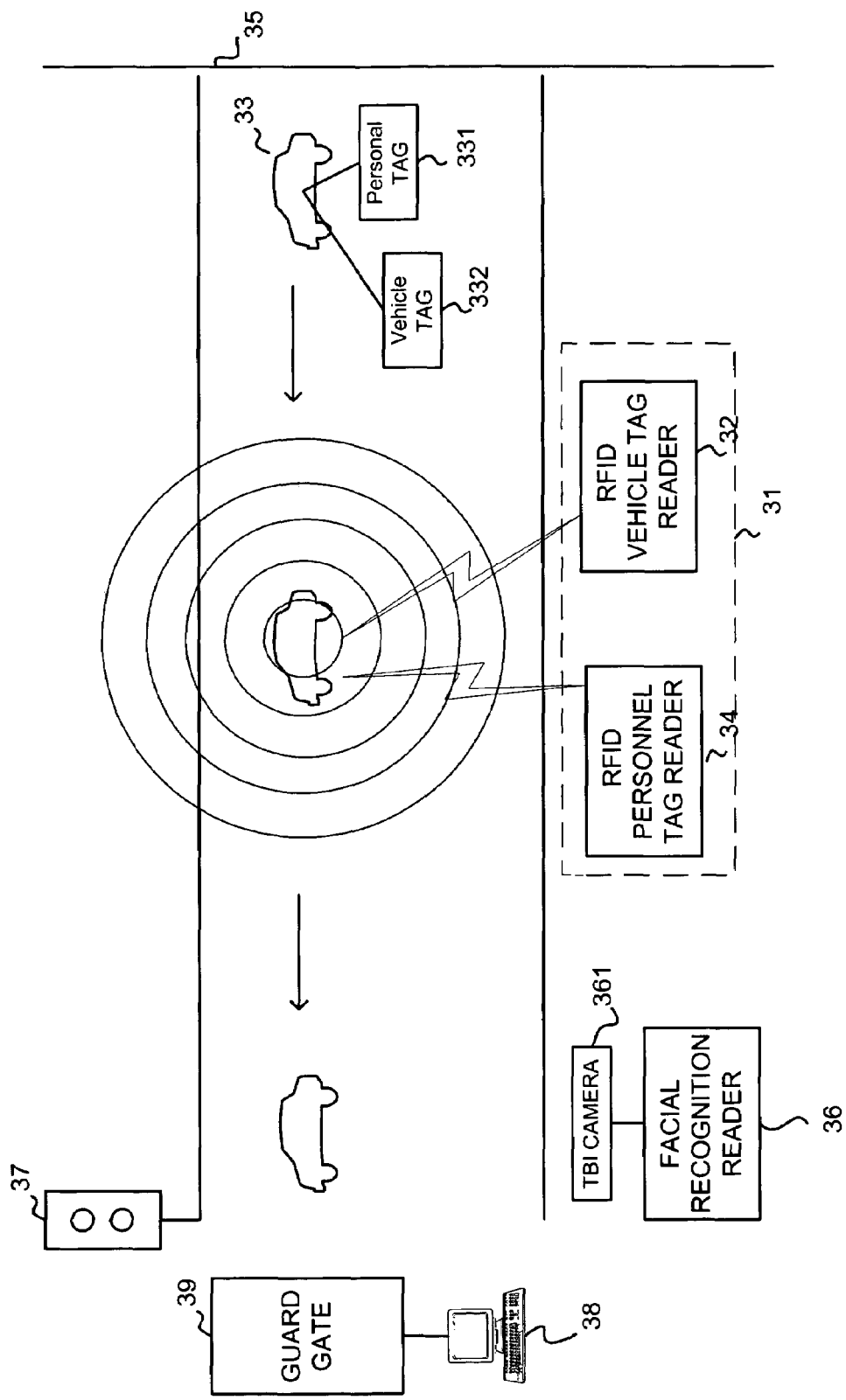
FIG. 3 is a schematic diagram of a security system in accordance with a second embodiment of the present invention, in which the security system is employed at a main gate of a facility to control entry of vehicles.

To further explain the security identification scheme of the present invention, FIG. 3 shows an exemplary security system in accordance with a first embodiment of the present invention. The security system of FIG. 3 is employed at a main gate of an organization or company to identify vehicles and drivers. Any vehicle (such as vehicle 33) and personnel who intend to pass through gate 39 is required to carry passive RFID vehicle tags 332 and active RFID personnel tags 331 (although both devices could be active or both could be passive.) The security system includes passive RFID vehicle tag reader 32 and active RFID driver tag reader 34 that are installed at a distance from gate 39 for reading the RFID vehicle tags carried by vehicle 33 and the RFID personnel tags carried by personnel riding in vehicle 33. Although the passive RFID vehicle tag reader 32 and the active RFID driver tag reader 34 are separate readers in the embodiment, these two readers may be also included in a single reader 31. To ensure a secured identification, the system also preferably includes facial recognition system 36 that is installed closer to gate 39 for scanning facial images of the personnel in vehicle 33. The system further includes a computer 38 that is installed in a guard booth or a control office at gate 39 and is preferably remotely connected with a central computer (not shown).

In operation, RFID vehicle tag reader 32 and RFID personnel tag reader 34 are arranged at locations close to sensing point 35. Therefore, when vehicle 33 passes through sensing point 35, such as a light beam, passive RFID vehicle tag reader 32 is first activated to read data from the RFID vehicle tag. Next, active RFID personnel tag reader 34 is activated to read data from the RFID personnel tag. The data read by readers 32 and 34 are immediately recorded and sent to computer 38 for further processing. It is noted that those data can be temporarily recorded in a database of the central computer or in a local database of computer 38. After an identification is complete, the data can be erased immediately or erased automatically after a period of time. Finally, when vehicle 33 reaches the position of facial recognition reader 36, a digital image camera such as TBI camera 361 installed in association with facial recognition system 36 takes a facial image of the driver, creates a face print for this particular driver, and sends the face print to computer 38.

After gathering all the data sent from readers 32, 34 and 36, computer 38 then retrieves information regarding the vehicle tag ID and the personnel tag ID sent from readers 32 and 34 to check if the read IDs match with the IDs stored in the database. Computer 38 also compares the face print which was just created with thousands of face prints stored in the database for a facial recognition. However, in a preferred embodiment, the computer 38 retrieves a stored face print which corresponds to the RFID data read by readers 32 and 34 to compare the stored face print with the just-created face print for a one-to-one matching. If the information matches, gate 39 will be opened to allow vehicle 33 to enter. If information does not match with data stored in the database, vehicle 33 can be stopped for further verification. The system of FIG. 3 may further include an indication light 37 which illuminates, for example, a green light when the driver and vehicle are authorized entry (authenticated), or a red light when unauthorized vehicle, unauthorized individual or incompatible face print is detected.

In some situations, there may be more than one person riding in vehicle 33. In this case, active RFID reader 34 and facial recognition reader 36 substantially simultaneously read each individual's RFID personnel tag and their facial images and create their individual face prints when vehicle 33 passes through readers 34 and 36.

As mentioned above, after computer 38 receives all the data from readers 32, 34 and 36, computer 38 retrieves the stored data from the database for matching and then indicates if those individuals and vehicle are authorized to enter the gate.

Figure 4:
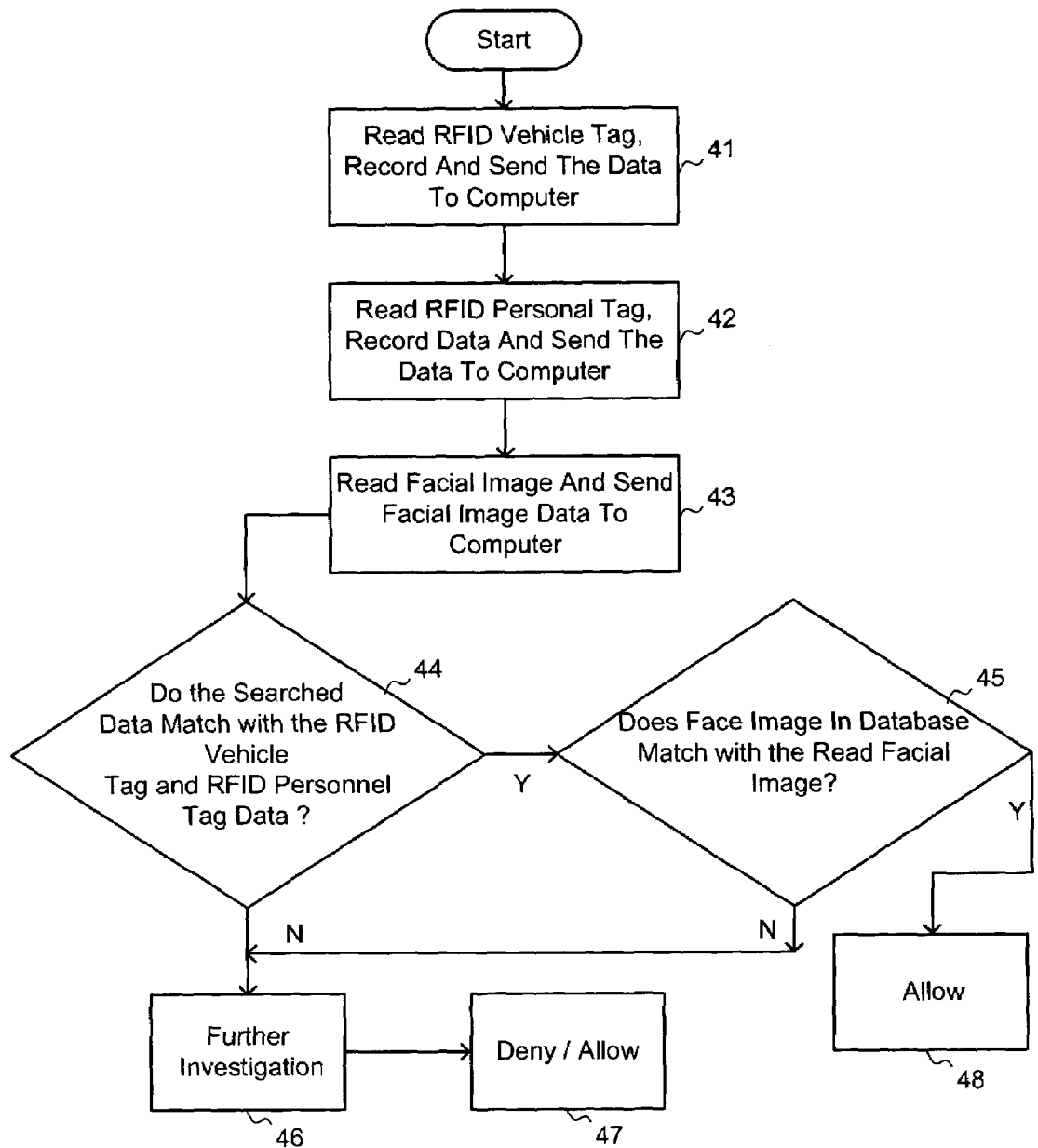
FIG. 4 is a flow chart showing an exemplary security identification method in accordance with the present invention.

A dynamic stand-off biometric verification method in accordance with the present invention is explained below with reference to FIG. 4. When vehicle 33 passes through sensing point 35, it actives RFID vehicle tag reader 32, RFID personal tag reader 34 and facial recognition reader 36. As readers 32, 34 and 36 are arranged in an order from a distance to gate 39, RFID vehicle tag reader 32 first reads data from RFID vehicle tag. The data is then recorded and sent to computer 38, as shown at step 41. At step 42, RFID personal tag reader 34 reads data from RFID personnel tag. As indicated in step 41, the data is also recorded and sent to computer 38. At step 43, when vehicle 33 finally reaches reader 36, camera 53 (shown in FIG. 5) takes images of personnel in the vehicle. The images are also recorded and sent to computer 38 for further processing. Next, at step 44, computer 38 decodes the data read from readers 32 and 34, retrieves relevant data from database and compares those data. The relevant data may include information about vehicle 33, information about personnel who are riding in vehicles 33 and their face prints that are stored in the database. When the data read from readers 32 and 34 match with the retrieved relevant data, the process moves to step 45. At step 45, computer 38 processes the facial images, detects the faces, and compares the detected faces with the retrieved face prints. In the embodiment, if any one of the data read from readers 32 and 34 and the recognized face at steps 44 and 45 do not match with the retrieved relative data from the computers database, a guard is preferably available to stop vehicle 33 to ask for more identification information, as shown at step 46. In another embodiment, to maintain smooth traffic flow, the vehicle may be directed to another area which is separated from gate 39. A guard at this separate area may stop the vehicle and ask for more identification information. Upon investigation of other identification information, the guard can then decide if vehicle 33 and personnel are to be granted or denied entry through gate 39, as shown at steps 47 and 48.

Moreover, in accordance with the present invention, the matching process performed by computer 38 is preferably accomplished in, perhaps, less than 1 second, so that a guard at gate 39 can react and stop the vehicle in time should the vehicle and/or personnel not be authenticated. So that this is possible, RFID reader 32 and 34, and facial recognition reader 36 are preferably installed far enough forward of gate 39. In a preferred embodiment of the present invention, when passing by facial recognition reader 36, it is not necessary for the driver to stop the vehicle or stay still for reader 36 to take the facial image. As the capture of facial image and the comparison process can be completed in a very short time, when the vehicle reaches gate 39, computer 38 has determined if this vehicle and/or driver are authenticated and has gate 39 react accordingly. This feature is beneficial because the system verifies the vehicle and personnel so rapidly that traffic congestion at the gate can be avoided. Furthermore, because the system described herein is non-invasive, personnel in vehicles hardly notice the higher security level that is achieved.

To provide efficient facial recognition, the present invention preferably employs a facial recognition scheme that uses a near-infrared light spectrum to scan facial images by sensing the reflective IR light of human faces. The reflective near-infrared (near-IR) light spectrum scheme avoids a characteristic problem found in conventional visual spectrum systems in which a computer system may intermittently fix on, and attempt to analyze a non-facial portion of the image. The facial recognition scheme of the present invention can quickly locate a face out of surrounding backgrounds so that the biometric data can be more efficiently captured and compared to that in the database. In turn, the processing speed of the facial recognition aspect of the system is greatly reduced.

More specifically, the facial recognition scheme of the present invention preferably uses a tri-band imaging (TBI) system, which uses common optics in low band near-IR, high band near-IR and visual band to analyze, detect and match a face.

Figure 5:
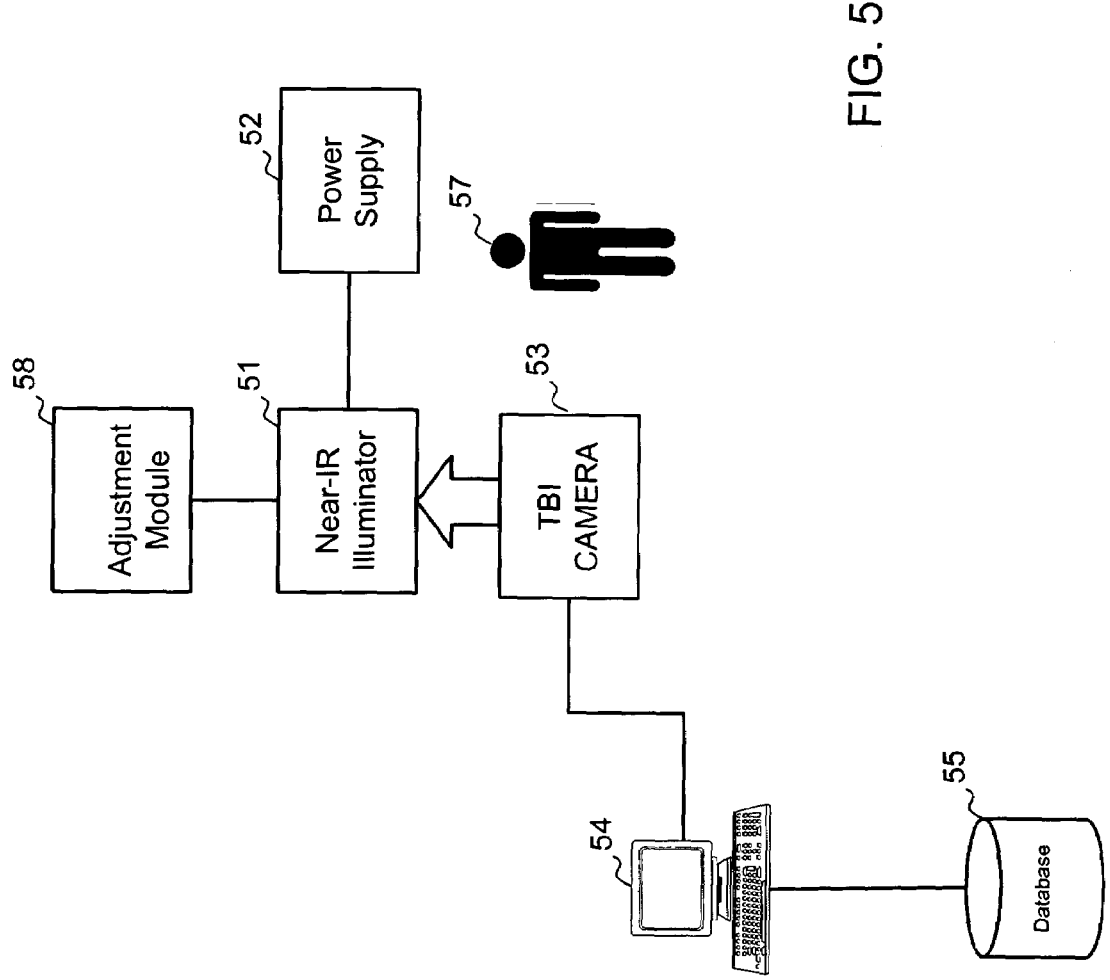
FIG. 5 is a schematic diagram showing an exemplary facial verification system in accordance with the present invention.

FIG. 5 is a schematic diagram of a facial recognition system that is preferably used in the present invention for identifying a facial image of a subject.

The facial recognition system includes near-IR illuminator 51 for generating near-IR light with both high wavelength bands and low wavelength bands on subject 57 (which may be a person or several persons), a power supply for supplying power to near-IR illuminator 51, and a TBI camera 53 for taking three digital images of subject 57. The facial recognition reader 36 of FIG. 3 preferably employs the facial recognition system of FIG. 5. The system may also include an illumination adjustment module 58 that evaluates current luminance level in the scene and adjusts power output from power supply 53 to change a light level of near IR illuminator 51. After facial images of subject 57 are taken, the images are then sent to computer 54 (same as computer 38 in FIG. 3) for processing to detect the face. Next, computer 54 searches database 55 for stored face prints that correspond to data read from RFID personnel tag and/or RFID vehicle tag and compares the face print just obtained with stored face print/face prints.

Figure 6:
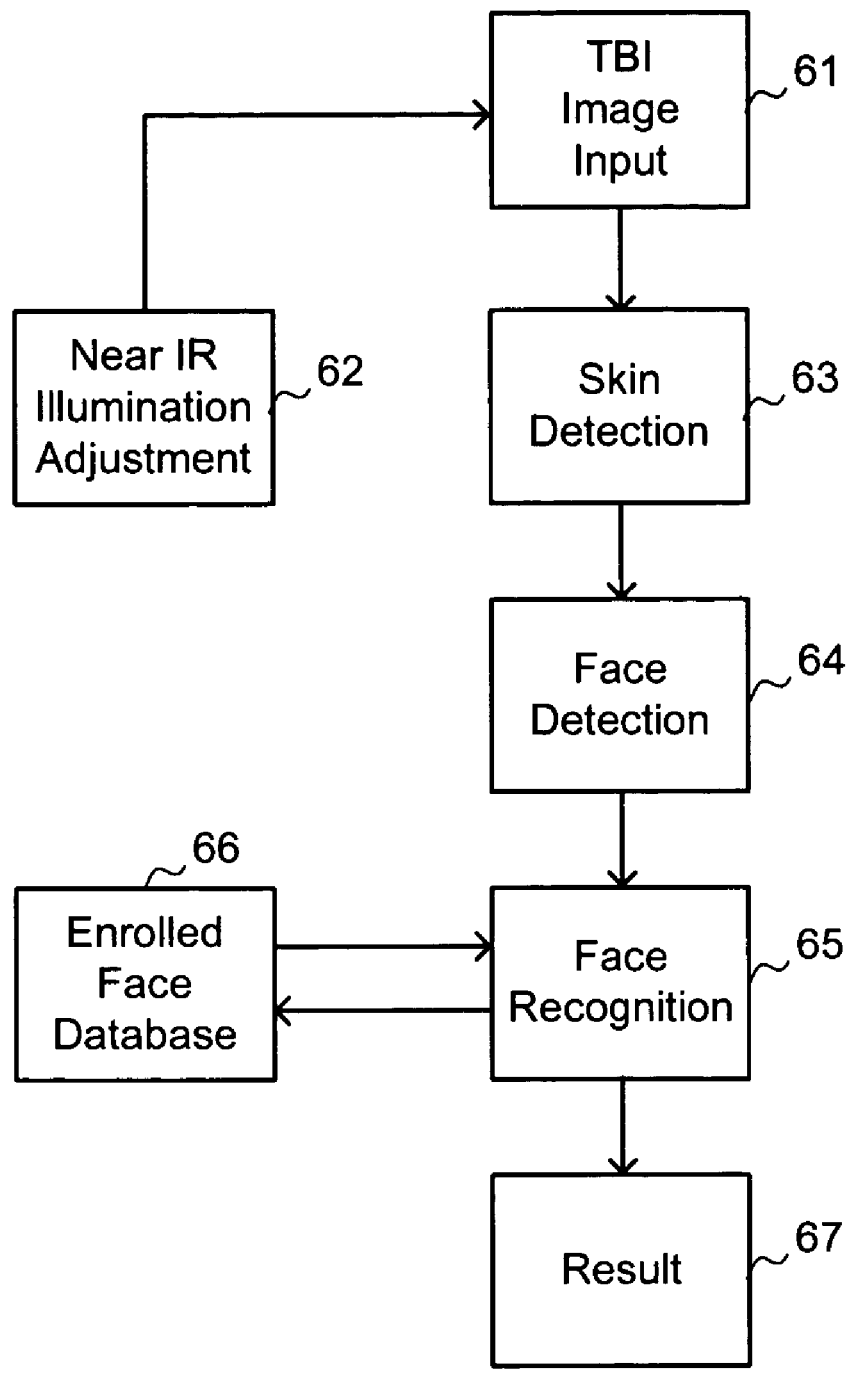
FIG. 6 is a flow chart that illustrates an exemplary facial verification method employed by a system like that shown in FIG. 5.

FIG. 6 shows a flow chart of a facial recognition method that can be practiced with the system of FIG. 5. As described above, when a vehicle passes a facial recognition reader such as reader 36 in FIG. 3, camera 53 takes pictures of a driver in the low near-IR band and high near-IR band. Images obtained by these two light bands are then sent to computer 54 for processing, as shown at step 61. Furthermore, illuminator adjustment module 58 constantly detects the luminance level at the scene and adjusts the illumination level of illuminator 51, at step 62. Computer 54 first performs a series of operations to isolate the skin in the images. Next, at step 64, computer 54 performs multi-band extraction operations to detect the face. As explained more fully below, the skin detection and face detection steps are preferably performed via tri-band image recognition. At step 65, a face is detected. At the same time, at step 66, computer 54 retrieves a face print from database 55 and compares the retrieved face print with the detected face. After a matching comparison, a result showing the recognized face image matches or does not match with the retrieved face print is obtained, as shown at step 67. If it matches, a gate (such as gate 39 of FIG. 3) or a door (not shown) is released to allow vehicle and/or individuals to enter. If it does not match, the gate or door remained locked. As described above, computer 54 can retrieve the face print from database 55 according to data read from RFID vehicle tag and/or RFID personal tag that subject 57 drives and/or carries to perform a one-to-one matching comparison process. Computer 54 can also retrieve a number of face prints from database 55, thereby performing a one-to-many matching comparison process.

Figure 7:
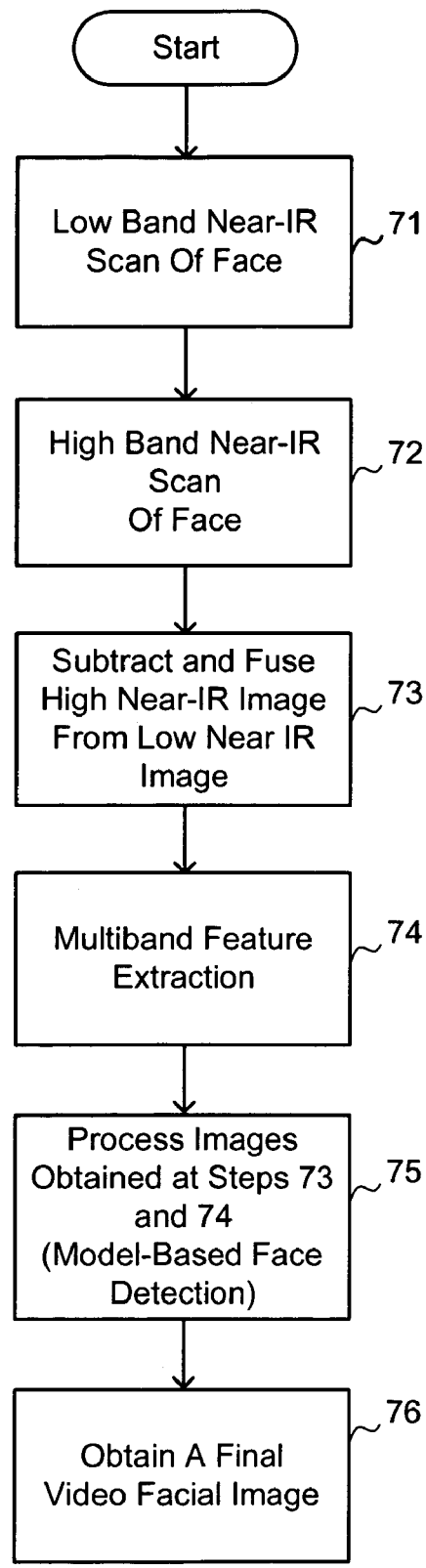
FIG. 7 is a flow chart that illustrates an exemplary tri-band-based face detection method employed by the method illustrated in FIG. 6.

FIG. 7 further explains a tri-band image detection and recognition process employed in the steps shown in FIG. 6. As described above, the facial recognition method of the present invention preferably utilizes low band near-IR light, high band near-IR light and visual band light to scan and detect a human face. At step 71, the method scans the facial image with low near-IR light and at step 72, the method scans the facial image with high near-IR light. At step 73, a high band image obtained at step 72 is subtracted (weighed) from a low band image obtained at step 71 and thresholded to obtain a skin image from the two near-IR images. Furthermore, at step 74, a feature image is extracted from the two near-IR images of steps 71 and 72 by a multi-band extraction scheme. Next, at step 75, computer 54 processes, as necessary, the feature image and the skin image obtained at steps 73 and 74, respectively. Processing may include, e.g., a series of generalized Hough transforms or model-sized algorithms. Such transforms or algorithms often lead to a good approximation of the location of the eyes, eyebrows, nose and mouth. And, based on the distance and relation between these features, a two-dimensional orientation and extent of the face is more easily obtained, at step 76. The obtained face is then compared by computer 54 with a retrieved face print from the database for matching.

Accordingly, the method and system of the present invention can effectively verify personnel and/or vehicles at a control gate by identifying data from RFID tags and matching facial images of the personnel with stored face prints. In addition to the control gate application, the method and system of the present invention can also be utilized in a building for controlling personnel access to different secured work areas. A facial recognition reader such as reader 23 of FIG. 2 can be installed at access control doors of each work area for capturing facial images of personnel. The data read from RFID personal tag and the facial image are then sent to a control computer for a verification process.

Furthermore, it is appreciated that in the security system of FIG. 3, a second camera can also be installed inside of gate 39 for monitoring vehicle 33 after the vehicle is allowed to enter gate 39. This embodiment provides yet another level of security to the facility. The use of such a second camera is sometimes referred to as post-processing.

Thus, the present invention provides a system and method for both dynamic and stand-off biometric verification in the sense that a person can be detected even if driving in a vehicle (dynamic) and, further, in that the person being detected need not actively place themselves in a particular place, or physically touch some device (stand-off) to effect a biometric verification.

The foregoing disclosure of the preferred embodiments of the present invention has been presented for purposes of illustration and description. It is not intended to be exhaustive or to limit the invention to the precise forms disclosed.

Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing dynamic security verification, comprising:

storing data regarding information and a face print of a person in a database, wherein the face print is represented by numerical codes of a face image of the person;

recording data regarding the information of the person in a database;

reading an RFID device and relating a read RFID number to the information stored in the database;

retrieving a face print corresponding to the data read from the RFID from the database;

scanning a face of the person with low near infrared (IR) light and high near-IR light to obtain a first facial image and a second facial image, respectively;

subtracting the second facial image from the first facial image to obtain a skin image of the person, performing a multi-band extraction on the first and second facial images to obtain a third facial image, combining the skin image and third facial image to obtain a final facial image; and comparing the final facial image with the retrieved face print.

2. The method of claim 1, wherein the data regarding the information of the person comprises personal information and vehicle information of the person.

3. The method of claim 1, wherein the face of the person is scanned dynamically and automatically when the person passes by a reading point.

4. A method for dynamically verifying a vehicle and a person riding in the vehicle at a control gate, wherein the vehicle carries an RFID vehicle tag and the person carries an RFID personnel tag, the method comprising:

recording information of the person and the vehicle in the RFID personnel tag and the RFID vehicle tag, respectively;

reading vehicle data from the RFID vehicle tag when the vehicle passes through a sensing point and sending the vehicle data to a computer for processing;

reading personal data from the REID personnel tag and sending the personal data to the computer for processing;

scanning a face of the person to obtain a facial image;

retrieving data regarding the vehicle and person from a database and comparing the retrieved data with the read vehicle and person data;

retrieving a stored face template from the database corresponding to the read vehicle and person data; and comparing the facial image with the retrieved face template to verify identity.

5. The method of claim 4, further comprising a step of indicating if the vehicle and the person are authorized entry when all of the data read from the REID vehicle tag and REID personnel tag and the facial image of the person match with the data and the face template stored in the database.

6. The method of claim 5, wherein when either one of the data read from the RFID vehicle and personnel tags and the facial image of the personnel fail to match with data and the face templates stored in the database, the vehicle is stopped for further questioning of the person.

7. The method of claim 4, wherein the scanning a face of the personnel further comprises:

scanning the face of the person by a low near-IR light and a high near-IR light to obtain a first and a second facial image, respectively;

subtracting the second facial image from the first facial image to obtain a skin image;

performing a multi-band extraction on the first and the second facial image to obtain a third facial image; and combining the skin image and the third facial image to obtain the final facial image.

8. A system for dynamic stand-off verification in which an RFID tag on which personal information of an individual including information of a vehicle driven by the individual is stored, comprising:
  a database for storing data regarding information and facial templates of a plurality of individuals, wherein each of the facial templates is represented by numerical codes of a face image of the person;
  an RFID tag reader for reading data from the RFID tag and for relating a read RFID number to the information stored in the database;
  a facial recognition reader for scanning a face of at least one of the plurality of individuals in a low near-IR band and a high near-IR band and obtaining scanned facial images for at least one individual; and
  a computer for processing the data read by the RFID tag reader and the facial images obtained by the facial recognition reader,
  wherein the data read by the RFID tag reader and the scanned facial images are sent to the computer, and the computer, according to received data, retrieves data regarding information of the vehicle and the at least one individual from the database and determines if the received data matches stored data; and
  wherein the computer processes the facial images from the facial recognition reader by means of a tri-band image recognition to obtain a final facial image, retrieves stored facial templates from the database and compares the processed facial images with the stored facial templates.

9. The system of claim 8, further comprising a sensor which is activated when the individual passes a sensing line, and the activation of the sensor further activates a sequence for the REID tag reader and the facial recognition reader.

10. The system of claim 8, wherein the personal information stored in the RFID tag includes information regarding the individual and a vehicle the individual is driving.

11. The system of claim 10, wherein the RFID tag comprises an RFID vehicle tag on which the information regarding the vehicle is stored and an RFID personnel tag on which the information regarding the individual is stored.

12. The system of claim 11, wherein the RFID tag reader includes an RFID vehicle tag reader and an RFID personnel tag reader.

13. The system of claim 8, further comprising an indication device for indicating if the data read from the RFID tag and the facial image read by the facial recognition data match with the data and the facial templates stored in the database.

14. The system of claim 8, wherein the RFID tag and the facial recognition reader are located in front of a control gate of a facility.

15. The system of claim 8, wherein the RFID tag and the facial recognition reader are located in front of a door of a building.

16. The system of claim 8, wherein the facial recognition reader comprises:
  a near-IR illuminator for generating near-IR light;
  an illumination adjustment module for adjusting the near-IR light based on environmental lighting conditions;
  a camera for taking facial images of the individual, and
  a computer for processing the facial images to obtain a face image.

17. The system of claim 8, wherein the data stored in the database comprises personnel and vehicle data.

18. The system of claim 17, wherein the data read from the RFID tag is related to the stored data in the database for the personnel and vehicle data.

19. The system of claim 8, wherein the computer processes the facial images to isolate a skin in the images and to detect a face in the facial images.

20. The system of claim 19, wherein the computer detects the face in the facial images by means of a multi-band extraction operation.

* * * * *